United States Patent [19]
Morimoto

[11] Patent Number: 5,181,126
[45] Date of Patent: Jan. 19, 1993

[54] READING DEVICE FOR FACSIMILE APPARATUS

[75] Inventor: Eiichi Morimoto, Kyoto, Japan
[73] Assignee: Murata Kikai Kabushiki Kaisha, Kyoto, Japan
[21] Appl. No.: 803,727
[22] Filed: Dec. 9, 1991

Related U.S. Application Data
[63] Continuation of Ser. No. 475,025, Feb. 5, 1990, abandoned.

[30] Foreign Application Priority Data
Feb. 9, 1989 [JP] Japan ............... 1-14493[U]

[51] Int. Cl.⁵ .................................. H04N 1/40
[52] U.S. Cl. ........................... 358/426; 358/261.1; 358/261.2; 358/430; 358/133; 375/122
[58] Field of Search ............. 358/426, 261.1, 261.2, 358/261.3, 261.4, 430, 431, 432, 133; 341/51; 375/122; 382/56

[56] References Cited
U.S. PATENT DOCUMENTS
| | | | |
|---|---|---|---|
| 3,873,761 | 3/1975 | Bigelow et al. | 358/486 |
| 4,158,861 | 6/1979 | Iizuka | 358/261.3 |
| 4,193,096 | 3/1980 | Stoffel | 358/430 |
| 4,608,607 | 8/1986 | Adachi | 358/432 |

Primary Examiner—Edward L. Coles, Sr.
Assistant Examiner—Jerome Grant, II
Attorney, Agent, or Firm—Spensley, Horn, Jubas & Lubitz

[57] ABSTRACT
In a facsimile apparatus, a changed number of picture elements of a single-line data and a preceding line data obtained by scanning a document in a main scanning direction are calculated and the single-line data or specific signal of the specific code generator are selected for transmission by comparison with a preset input value.

5 Claims, 2 Drawing Sheets

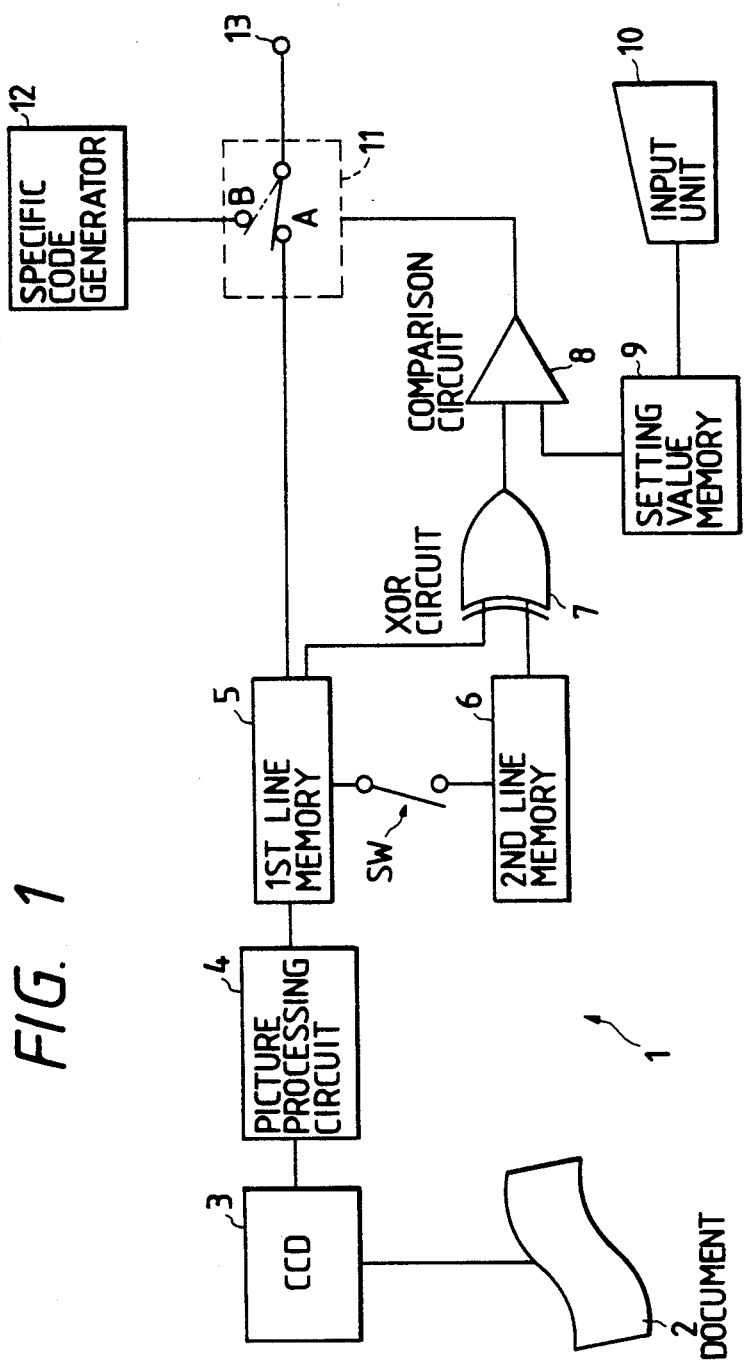

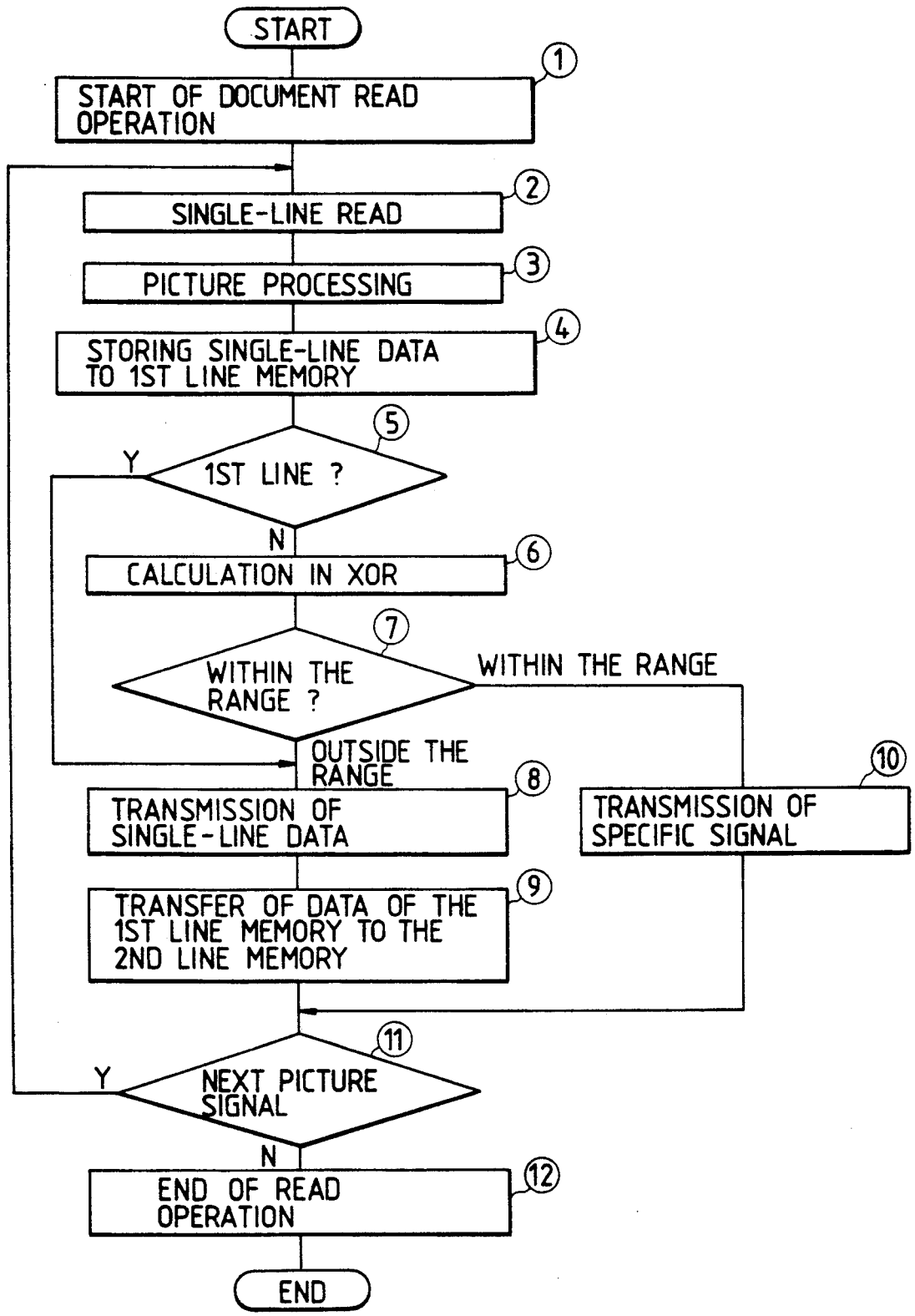

READING DEVICE FOR FACSIMILE APPARATUS

This is a continuation of application Ser. No. 07/475,025 filed on Feb. 5, 1990 now abandoned.

FIELD OF THE INVENTION

The present invention relates to a reading device for a facsimile apparatus.

RELATED ART STATEMENT

In the conventional facsimile apparatus, a document is read by a document reader in the transmitting side and picture data read out from a document is modulated and transmitted. Meanwhile, in the receiving side, the received picture data is demodulated and recorded by a recording unit.

In general, in such a document reader, picture information of a document is sequentially read line by line (single horizontal scanning) by a photoelectric converting element such as CCD and the picture data of single-line read out from a document is sequentially transmitted.

However, the picture data of a single-line sequentially read by such document reader sometimes becomes white for the total width of the single-line (information is not included) or includes black areas in the single-line (information is included).

In the case where the total width of a line becomes white as described above, the line skip transmission can be made but in case black area is included in single-line, the picture data of single-line must be transmitted, resulting in a problem that the transmission time becomes longer and transmission cost rises.

OBJECT AND SUMMARY OF THE INVENTION

The device of the present invention has been proposed considering such background and it is an object of the present invention to provide a document reader which realizes high speed transmission of picture data including information.

In order to achieve the object described above, the device of the present invention comprises a first memory means for storing single-line data obtained by scanning a document in the main scanning direction, a second memory means for storing the single-line data before the single-line data, an arithmetic operation means for calculating changed number of picture elements of these two single-line data, a specific code generating means for generating a specific signal having the signal duration shorter than the data of single-line data and a deciding means for transmitting the single-line data of the first line memory or the specific signal of specific code signal generating means by selecting them through comparison between the preset input value and the changed number of picture element.

BRIEF DESCRIPTION OF THE DRAWINGS

FIG. 1 is a block diagram indicating an example of a document reader in a facsimile apparatus of the present invention;

FIG. 2 is a diagram for explaining the changed number of picture elements from the picture element pattern trains a, b of a pair of single-line data; and FIG. 3 is a flowchart indicating the operation procedures of the present invention.

DETAILED DESCRIPTION OF PREFERRED EMBODIMENTS

FIG. 1 is a block diagram indicating an electrical structure of a document reader 1.

In this figure, the numeral 2 designates a document to be transmitted; 3, a photoelectric converting element realized by CCD, etc.; 4, a picture processing circuit. This picture processing circuit 4 is formed by a sample & hold circuit, a gain control circuit and an analog/digital converting circuit, etc. to process an analog picture signal sent from such photoelectric converting element. 5 and 6 designate line memories for accummulating data of single-line (single horizontal scanning) of a document 2. 5 is a first line memory for storing the data of the present line and 6 is a second line memory for storing the data of a preceding line or previous lines. SW designates a transfer switch for transferring the single-line data stored in the first line memory 5 to the second line memory 6 as required and this switch SW is usually held in the open condition.

The numeral 7 designates an exclusive OR circuit (XOR circuit) to calculate changed number of picture elements of respective single-line data stored in the first line memory 5 and the second line memory 6. As shown in FIG. 2, for example, in the case of picture pattern train "a" of single-line data stored in the first line memory 5 and the picture element pattern train "b" of single-line data stored in the second line memory 6, the changed number of picture elements N=4 is calculated by taking the exclusive OR "c" in the XOR circuit 7 described above. In the picture pattern trains "a", "b", [1] indicates black information, while [0] indicates white information.

The numeral 8 designates a comparator for comparing an input value N (changed number of picture elements) from the XOR circuit 7 and a setting value M from the setting data memory 9. This setting value M may be input previously to the setting value memory 9 with an input unit 10 such as ten key, etc. Moreover, the comparator 8 compares the changed number of picture elements N calculated by the XOR circuit 7 with the preset input value M. When, $N \leq M$, the comparison value [0] is output and when, $N > M$, the comparison value [1] is output.

Here, the preset value M must be carefully determined considering information density of document. For example, in case a document in size of A4 is scanned, the number of picture elements of single-line data is 1,728 dots. If a certain picture element is white, the picture element of the next single-line data is also often white. Namely, there is correlation in the subscanning direction. Therefore, for example, when the document of A4 size is to be transmitted in the embodiment of the present invention, the setting value is set to about 3% of the number of picture elements of single-line data. In this case, M=50 is input from the ten key of input unit (10) as the setting value. Moreover, it is of course possible that as the setting value M, a fixed setting value such as M=50 for size A4, M=60 for B4 size, and M=70 for A3 size, for example, is accumulated in the setting value memory 9, based on the size of document, a document size is detected by a document width detection sensor (not illustrated) of the document reader 1, and the fixed setting value M is set automatically depending on such document size.

A comparison value from the comparator 8 described above is input to a deciding circuit 11. This deciding circuit 11 has a selection switch which selects the single-line data stored in the first line memory 5 or the specific signal from the specific code generator 12. When the comparison value from the comparator 8 is [0], the selection switch of deciding circuit 11 is set in the condition B and the specific signal is fetched from the specific code generator 12 and is then output to the output terminal 13. When the comparison value from the comparator 8 is [1], the selection switch of deciding circuit is set in the condition A and the single-line data from the first line memory 5 is fetched and is then output to the output terminal 13. From the output terminal 13, signal is transmitted to the line through the encoding circuit (not illustrated) and the transmitting circuit (not illustrated) formed by modem and network control unit (NCU).

The specific signal from such specific code generator 12 is so far shorter than the signal duration of single-line data. For example, it may be set to the duration such as the signal for transmitting total white line. Namely, about 12 bits (during encoding) is necessary for both data code and end of line code (EOL) for transmission of total white line in the regulation GIII of CCITT and high speed transmission can be realized and the period required for transmission can be considerably reduced by setting such specific signal to about 12 bits (during encoding).

Function of the document reader of the present invention will then be explained. FIG. 3 is a flowchart for explaining the signal processing of the picture data read out from the document.

First, when read operation of document 2 to be transmitted is started (step ①), the analog signal of single-line read in the main scanning direction by the photoelectric conversion element 3 (step ②) is sample-held by the sample & hold circuit in the picture processing circuit 4, control such as addition of predetermined gain is carried out in the gain control circuit and picture processing such as conversion to digital signal is then carried out in the A/D conversion circuit (step ③). The single line data having completed picture processing is stored in the first line memory 5 as the current line data. In case the single-line data corresponds to the first single-line, processing skips to the step ⑧ from ⑤. Thereby, the single-line data is output to the output terminal 13 and the single-line data of the first line memory 5 is transferred to the second line memory 6 and stored as the preceding line data. In this case, the transfer switch SW is set to the closed condition, while the selection switch of deciding circuit 11 is set to the condition A.

In case the next picture signal "exists" in the step ⑪, processing returns to the step ②, the single-line data of the next single-line obtained by picture processing (step ③) is stored as the current line data in the first line memory 5 (step ④). The changed number of picture elements N of the current line of the first line memory 5 and the preceding line of the second line memory 6 are calculated in the XOR circuit 7 (step ⑥) and it is compared with the setting value M of the setting value memory 9 in the comparator 8 (step ⑦).

In the step ⑦, when the changed number of picture elements N is in the outside of the range of setting value M (N>M), the deciding circuit 11 sets the selection switch to the condition A to output the single-line data of the first line memory 5 to the output terminal 13 (step ⑧) and to transfer the single-line data of the first line memory 5 to the second line memory 6 by closing the selection switch SW for transfer (step ⑨). In addition, in the step ⑦, when the changed number of picture elements N is within the range of setting value M (N≦M), the deciding circuit 11 sets the selection switch to the condition B to output the specific signal from the specific code generator 12 to the output terminal 13 (step ⑩) and does not carry out the transfer by holding the selection switch SW for transfer to the open condition. Namely, until the changed number of picture elements N comes to a value within the range of setting value M (N>M), transmission of single-line data is not carried out and only the specific signal is transmitted.

When the next picture signal disappears by repeating the steps ②-⑪ read operation terminates (step⑫).

Though not illustrated in the figure, the recording unit in the receiving side detects that the received picture data is the single-line data or specific signal, records the data when it is the single-line data, and records the data when it is the specific signal by fetching the preceding line (or the previous lines) being stored in the line memory provided in the recording unit.

According to the present embodiment, as described above, the changed number of picture elements N of single-line data and preceding single-line data obtained by scanning the document in the main scanning direction are calculated and the single-line data or specific signal of the specific code generator 12 is selected for transmission by the comparison with the preset input setting value M. Accordingly, when the changed number of picture elements N of each single-line is within the range of setting value M (N≧M), the line skip transmission becomes possible, transmission time can be curtailed and transmission cost may be lowered by transmitting the specific signal.

In other words, in the embodiment mentioned previously, if correlation does not exist in every single-line where the document information is indicated with small characters, the single-line data scanned is transmitted. When correlation exists in the single-line where information is indicated by coarse characters, the line skip transmission is carried out. As a result, the effect similar to that obtained by changing automatically the subscanning line density depending on information density of document can be attained.

Moreover, in above embodiment, the setting value M to be stored in the setting value memory 9 can be set freely by inputting it from the input unit 10. Therefore, the transmission efficiency can further be improved by changing the setting value M depending on the information density of document to be transmitted.

As described above in detail, according to the present embodiment, the changed number of picture elements of the single-line data and the preceding line data obtained by scanning the document in the main scanning direction are calculated and the single-line data or specific signal of the specific code generator are selected for transmission by comparison with the preset input value. Therefore, when the changed number of picture elements of every single-line data is within the range of setting value, the specific signal is transmitted. Thereby, the skip transmission is possible, transmission time can be curtailed and transmission cost can also be lowered.

What is claimed is:

1. A document reader in a facsimile apparatus comprising:

first memory means for storing a current line of data obtained by scanning a document in a predetermined scanning direction, the data including picture elements, second memory means for storing a previously scanned line of data, the data including picture elements, means for comparing the picture elements of the current line of data to corresponding picture elements of the previously scanned line of data, means for calculating an amount of changed picture elements between the current line of data stored in the first memory means and the previous line of data stored in the second memory means, means for generating a specific signal having a signal duration shorter than a signal representing said current line of data, means for comparing the calculated amount of changed picture elements with a predetermined value and producing an output signal indicative thereof, and means for transmitting the signal representing the current line of data stored in the first memory means or the generated specific signal in response to the signal from the means for comparing.

2. A document reader in a facsimile apparatus according to claim 1, further comprising:

means for selectively setting the predetermined value as a percentage of a set number of picture elements for a scanned line of data.

3. A document reader in a facsimile apparatus according to claim 1, wherein the set number of picture elements for a scanned line of data is determined based on a size of the paper being scanned.

4. A document reading method in a facsimile apparatus comprising the steps of:

comparing picture elements of a current lien of data to corresponding picture elements of a preceding line of data, the data obtained by scanning a document in a predetermined scanning direction, calculating a number of changed picture elements between the current line of data and the preceding line of data, comparing the number of changed picture elements with a preset value, and selecting the current lien of data or a predetermined signal for transmission based on a result of a comparing of the number of changed picture elements with the preset value so that a line skip transmission becomes possible.

5. A document reading method in a facsimile apparatus according to claim 4, further comprising the step of:

selectively setting the predetermined value as a percentage of a set number of picture elements for a scanned line of data.

* * * * *